(12) United States Patent  (10) Patent No.:   US 12,634,010 B2
Li et al.  (45) Date of Patent:   May 19, 2026

(54) VISIBLE LIGHT POSITIONING-ASSISTED MULTI-USER OPTICAL COMMUNICATION SYSTEM AND METHOD THEREFOR

(71) Applicant: HUBEI UNIVERSITY OF ARTS AND SCIENCE, Xiangyang (CN)

(72) Inventors: Zhengpeng Li, Xiangyang (CN); Qianqian Luo, Xiangyang (CN); Zhi Li, Xiangyang (CN)

(73) Assignee: HUBEI UNIVERSITY OF ARTS AND SCIENCE, Xiangyang (CN)

( * ) Notice: Subject to any disclaimer, the term of this patent is extended or adjusted under 35 U.S.C. 154(b) by 302 days.

(21) Appl. No.: 18/590,037

(22) Filed: Feb. 28, 2024

(65) Prior Publication Data

US 2024/0235680 A1   Jul. 11, 2024

Related U.S. Application Data

(63) Continuation of application No. PCT/CN2022/082159, filed on Mar. 22, 2022.

(30) Foreign Application Priority Data

Sep. 17, 2021   (CN) .......................... 202111092479.2

(51) Int. Cl.
 *H04B 10/116*    (2013.01)
 *H04B 10/114*    (2013.01)
 *H04W 64/00*    (2009.01)

(52) U.S. Cl.
 CPC ......... *H04B 10/116* (2013.01); *H04B 10/114* (2013.01); *H04W 64/00* (2013.01)

(58) Field of Classification Search
 None
 See application file for complete search history.

(56) References Cited

U.S. PATENT DOCUMENTS 6,600,899 B1 *  7/2003  Radomsky ......... H04B 10/1149
                                              379/56.3
7,969,297 B2 *  6/2011  Haartsen ............ H04B 10/1149
                                              340/531

(Continued)

FOREIGN PATENT DOCUMENTS

CA        2764120 A1    8/2010
CN      103580759 A     2/2014

(Continued)

OTHER PUBLICATIONS

Notification to Grant Patent Right for Invention issued in counterpart Chinese Patent Application No. 202111092479.2, dated Feb. 19, 2025.

(Continued)

*Primary Examiner* — Jai M Lee
(74) *Attorney, Agent, or Firm* — Westbridge IP LLC

(57)            ABSTRACT

A visible light positioning (VLP)-assisted multi-user optical communication system includes a micro base station and a user receiver; the micro base station includes a mounting plate, a visible light locator is provided at a middle of a bottom surface of the mounting plate, the bottom surface of the mounting plate is provided with a plurality of automatic tracking optical communication devices surrounding around the visible light locator; the visible light locator is connected to the plurality of automatic tracking optical communication devices through a serial bus; a micro base station ID and a current working status data of the automatic tracking optical communication devices are cyclically broadcast to a coverage area through the visible light locator; a user location coordinate and a user identification are sent to the visible light locator by the user receiver.

8 Claims, 5 Drawing Sheets

(56) References Cited

U.S. PATENT DOCUMENTS

| | | | | |
|---|---|---|---|---|
| 8,510,033 | B2 * | 8/2013 | Park | G01C 21/206 |
| | | | | 398/43 |
| 9,184,837 | B2 * | 11/2015 | Yoo | H04B 10/116 |
| 9,791,544 | B2 * | 10/2017 | Jovicic | H04W 64/006 |
| 10,001,547 | B2 * | 6/2018 | Ryan | G01S 5/16 |
| 10,187,163 | B2 * | 1/2019 | Breuer | H05B 45/30 |
| 11,038,661 | B1 * | 6/2021 | Mondal | H04L 5/0073 |
| 11,128,376 | B1 * | 9/2021 | Passe | H04W 12/082 |
| 11,294,065 | B2 * | 4/2022 | Marmet | G01S 1/02 |
| 11,664,897 | B2 * | 5/2023 | Pederson | F21V 3/049 |
| | | | | 398/128 |
| 12,063,068 | B2 * | 8/2024 | Utter | G01S 1/7038 |
| 12,081,263 | B2 * | 9/2024 | Stavridis | H04B 10/114 |
| 2005/0213109 | A1 * | 9/2005 | Schell | G01S 17/06 |
| | | | | 356/614 |
| 2010/0129087 | A1 * | 5/2010 | Kim | H04B 10/1149 |
| | | | | 398/182 |
| 2015/0153160 | A1 * | 6/2015 | James | G01C 21/206 |
| | | | | 356/614 |
| 2017/0207851 | A1 * | 7/2017 | Zeng | H04B 10/116 |
| 2018/0262270 | A1 | 9/2018 | Maricic et al. | |
| 2019/0107628 | A1 | 4/2019 | Marmet et al. | |
| 2021/0067247 | A1 * | 3/2021 | Liverman | H04B 10/1149 |

FOREIGN PATENT DOCUMENTS

| | | |
|---|---|---|
| CN | 104820203 A | 8/2015 |
| CN | 105099554 A | 11/2015 |
| CN | 106027149 A | 10/2016 |
| CN | 106533559 A | 3/2017 |
| CN | 111600656 A | 8/2020 |
| CN | 111953417 A | 11/2020 |
| CN | 113900063 A | 1/2022 |
| CN | 216160819 U | 4/2022 |

OTHER PUBLICATIONS

Zhu et al., Design of fast pointing system between wireless laser communication terminals based on GPS, Transducer and Microsystem Technologies, vol. 36, No. 12, dated Dec. 11, 2017.

International Search Report and Written Opinion issued in corresponding PCT Application No. PCT/CN2022/082159, dated Jun. 17, 2022.

* cited by examiner

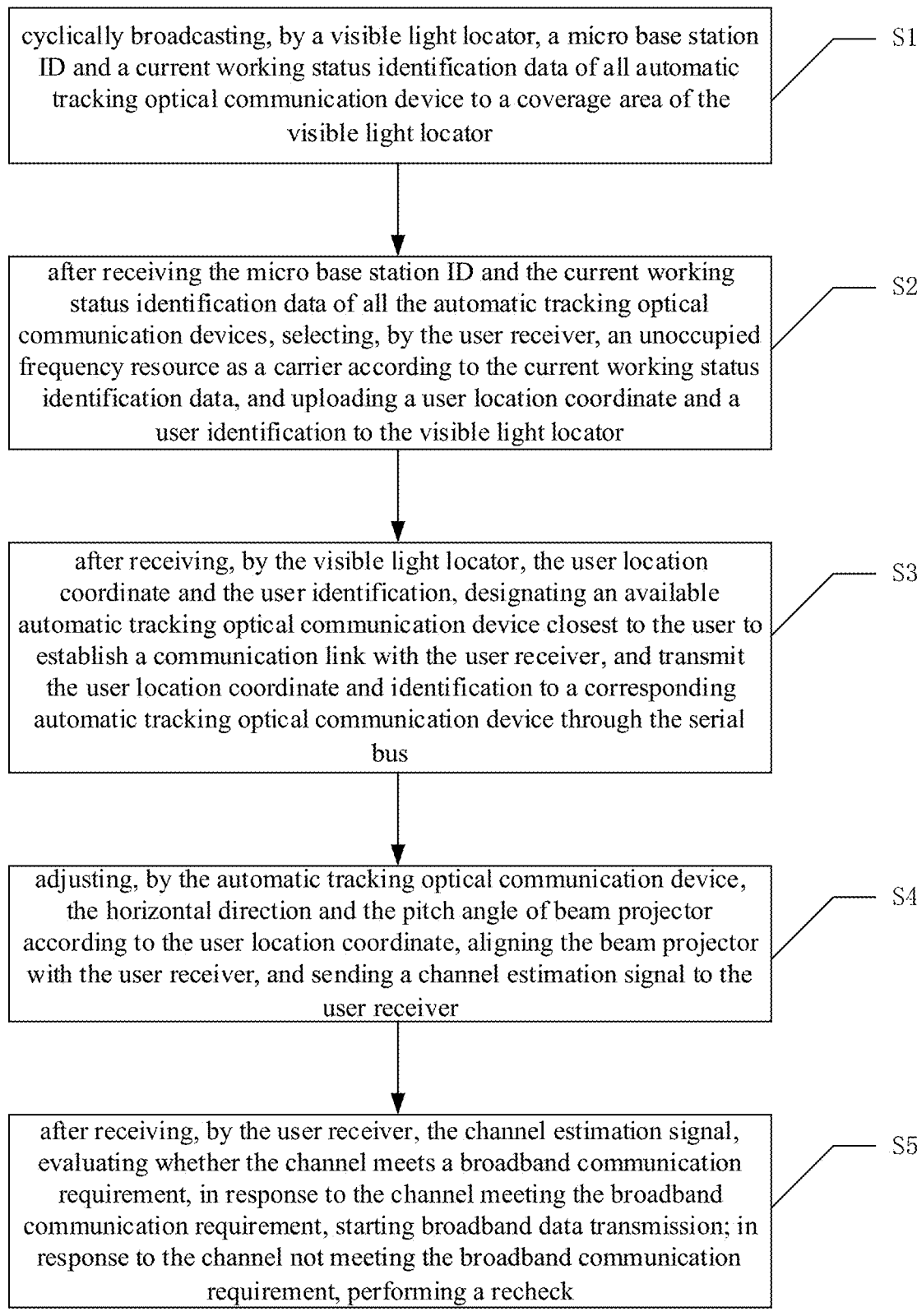

cyclically broadcasting, by a visible light locator, a micro base station ID and a current working status identification data of all automatic tracking optical communication device to a coverage area of the visible light locator — S1 after receiving the micro base station ID and the current working status identification data of all the automatic tracking optical communication devices, selecting, by the user receiver, an unoccupied frequency resource as a carrier according to the current working status identification data, and uploading a user location coordinate and a user identification to the visible light locator — S2 after receiving, by the visible light locator, the user location coordinate and the user identification, designating an available automatic tracking optical communication device closest to the user to establish a communication link with the user receiver, and transmit the user location coordinate and identification to a corresponding automatic tracking optical communication device through the serial bus — S3 adjusting, by the automatic tracking optical communication device, the horizontal direction and the pitch angle of beam projector according to the user location coordinate, aligning the beam projector with the user receiver, and sending a channel estimation signal to the user receiver — S4 after receiving, by the user receiver, the channel estimation signal, evaluating whether the channel meets a broadband communication requirement, in response to the channel meeting the broadband communication requirement, starting broadband data transmission; in response to the channel not meeting the broadband communication requirement, performing a recheck — S5

FIG. 7

VISIBLE LIGHT POSITIONING-ASSISTED MULTI-USER OPTICAL COMMUNICATION SYSTEM AND METHOD THEREFOR

CROSS-REFERENCE TO RELATED APPLICATIONS

This application is a continuation application of International Application No. PCT/CN2022/082159, filed on Mar. 22, 2022, which claims priority to Chinese Patent Application No. 202111092479.2, filed on Sep. 17, 2021. The disclosures of the above-mentioned applications are incorporated herein by reference in their entireties.

TECHNICAL FIELD

The present application relates to the technical field of visible light communication, and in particular to a visible light positioning (VLP)-assisted multi-user optical communication system and a method therefor.

BACKGROUND

Visible light communication (VLC) is considered by the industry to be the best substitute technology of wireless personal area network (WPAN) communication due to its advantages such as spectrum authorization-free, high security and confidentiality, ultra-wide spectrum of 400 to 800 THz, and no electromagnetic radiation. It is expected to be widely used in next-generation 6G, 7G and even 8G communication scenarios. At present, the transmitting devices of VLC mainly use light emitting diodes (LED), laser diodes (LD) and the newly developed super luminescent diodes (SLD). The receiving devices usually use photodiode (Positive Intrinsic-Negative (PIN)), avalanche photon diodes (APD) and image sensor, etc.

LED usually adopts spontaneous emission mode, and the light emitted is incoherent light with a wide spectrum and omnidirectional emission direction. The total output power can be high, however, due to the large emission angle, the optical power density is low. LD adopts the amplified stimulated emission mode, and the light emitted is coherent light with a narrow spectrum, strong directivity in the emission direction, high output power, and high optical power density. At present, the main structure of the experimentally verified VLC system is still the point-to-point communication. If LED is used, a condenser lens needs to be installed on the front end of the LED to form a parallel beam, at the same time, a convex lens needs to be installed on the receiving end to condense the light on the surface of the photo detector (PD). The advantage of this is that it effectively increases the optical power density of the LED, which greatly improves the signal-to-noise ratio of the receiver, thereby greatly reducing the bit error rate of communication and thereby improving communication quality.

However, this point-to-point VLC system will face some bottleneck problems if applied in actual WPAN scenarios. Usually, in a WPAN scenario, a micro base station will serve multiple users at the same time, therefore, it is required to be able to achieve omnidirectional radiation communication from point to surface or even point to three-dimensional (3D) space just like wireless-fidelity (Wi-Fi). If the VLC micro base station uses LED, although point-to-face coverage can also be achieved, the low radiation power density of LED results in weak signals received by PD and a low signal-to-noise ratio, which affects communication quality. At this time, in order to improve the communication quality, we can only increase the radiated light power of the LED, however, this will directly lead to excessive energy consumption of the base station, excessive lighting, and poor user experience. If the VLC micro base station uses LD, due to its strong directionality, we can use milliwatt-level LD to implement point-to-point communication, which can effectively save energy consumption. However, the problem is that how to establish real-time point-to-point communication links with users at random locations on the ground.

For example, the Chinese patent with publication number CN113162688A discloses a visible light two-way communication and locating system, including a first communication node and a second communication node. The first communication node includes a location light source, a first communication light source, a PIN/APD detector module, and a first driving device assembly that drives the first communication light source and the PIN/APD detector module to rotate. The second communication node includes a composite receiver, a second communication light source, and a second driving device that drives the second communication light source to rotate; the composite receiver is configured to receive signals from the location light source and the first communication light source. The composite receiver includes multiple detectors; the PIN/APD detector module is configured to receive signals from the second communication light source. Through two communication nodes, the system can realize simultaneous uploading and downloading of data by two communication nodes in the visible light band, and can realize locating and tracking functions, so that even if the two communication nodes move relative to each other, the alignment of the first communication light source and the composite receiver, the alignment of the second communication light source and the PIN/APD detector module can be maintained to ensure communication quality. This patent can locate and track the location information of nodes in real time, achieve real-time alignment of two communication nodes, and ensure the reliability and stability of visible light communication.

However, although the above patent can realize point-to-point communication and can realize locating and tracking functions, its positioning principle is quite different from the present application.

SUMMARY

The main objective of the present application is to provide a visible light positioning (VLP)-assisted multi-user optical communication system and a method therefor to solve the problem of the point-to-point communication link connection between VLC micro base stations and multiple users at random positions in the existing technology. The system can simultaneously provide broadband transmission services for multi-users, which has little mutual interference and good application value.

In order to achieve the above object, the technical solution adopted by the present application is as follows.

A VLP-assisted multi-user optical communication system and a method therefor, including: a micro base station; and a user receiver.

In an embodiment, the micro base station includes a mounting plate, a visible light locator (multi-directional LED integrated lamp, hereinafter referred to as "integrated lamp") is provided at a middle of a bottom surface of the mounting plate, the bottom surface of the mounting plate is provided with a plurality of automatic tracking optical communication devices surrounding around the visible light locator.

In an embodiment, the visible light locator is connected to the plurality of automatic tracking optical communication devices through a serial bus; a micro base station ID and a current working status data of the automatic tracking optical communication devices are cyclically broadcast to a coverage area through the visible light locator; the user receiver is configured to send user location coordinate and a user identification to the visible light locator; and the visible light locator is configured to designate an available automatic tracking optical communication device closest to the user to establish a communication link with the user receiver according to the user location coordinate and the user identification.

In an embodiment, the visible light locator includes a mounting base, a radiator and a regular N frustum, N≥3, and N∈Z⁺; the regular N frustum is installed on the mounting base through the radiator, and the mounting base is installed at a middle of the bottom surface of the mounting plate; the mounting base is provided with a control module, an LED drive modulation module and an infrared receiving module, and the LED drive modulation module and infrared receiving module are respectively connected to the control module; a plurality of first infrared receiving tubes are provided around the radiator, and the first infrared receiving tubes are connected to the infrared receiving module; N+1 surfaces of the regular N frustum are provided with circuit substrates, each circuit substrate is provided with an LED, and the LED is connected to the LED drive modulation module through the circuit substrate; the first infrared receiving tube is configured to receive the user location coordinate information sent by the user; the LED drive modulation module is configured to drive the LED to emit frequency shift keyed (FSK) signals with different frequencies; and the control module is configured to process the received infrared signal and generate the LED drive signal.

In an embodiment, the automatic tracking optical communication device includes a base, and a horizontal rotation servo mechanism, a pitch rotation servo mechanism and a beam projector connected in sequence are installed on the base; the base is provided with a data processing unit, a driving unit and a communication signal processing unit, and the driving unit and the communication signal processing unit are respectively connected to the data processing unit; the output end of the beam projector is provided with a light emitting device and a second infrared receiving tube, the light emitting device and the second infrared receiving tube are respectively connected to the data processing unit; the light emitting device is configured to send a downlink broadband data, and the second infrared receiving tube is configured to receive an uplink broadband data; the driving unit is configured to drive the horizontal rotation servo mechanism and the pitch rotation servo mechanism to adjust a horizontal direction and a pitch angle of the beam projector; and the data processing unit is configured to process a data sent by the visible light locator, and generate a target tracking signal to the driving unit.

In an embodiment, the user receiver includes a signal processing module, a photodiode connected to the signal processing module, an infrared light emitting diode and a range measurement probe; the photodiode is configured to receive an optical signal emitted by the visible light locator and the automatic tracking optical communication device; the infrared light emitting diode is configured to send infrared signals to the visible light locator and the automatic tracking optical communication device; the range measurement probe is configured to measure the height data; the signal processing module is configured to process and receive signals, and generate modulated signals.

Correspondingly to the above optical communication system, the present application further provides a VLP-assisted multi-user optical communication method, including the following steps:

S1, cyclically broadcasting, by a visible light locator, a micro base station ID and a current working status identification data of all automatic tracking optical communication device to a coverage area of the visible light locator;

S2, after receiving the micro base station ID and the current working status identification data of all the automatic tracking optical communication devices, selecting, by the user receiver, an unoccupied frequency resource as a carrier according to the current working status identification data, and uploading a user location coordinate and a user identification to the visible light locator;

S3, after receiving, by the visible light locator, the user location coordinate and the user identification, designating an available automatic tracking optical communication device closest to the user to establish a communication link with the user receiver, and transmit the user location coordinate and identification to a corresponding automatic tracking optical communication device through the serial bus;

S4, adjusting, by the automatic tracking optical communication device, the horizontal direction and the pitch angle of beam projector according to the user location coordinate, aligning the beam projector with the user receiver, and sending a channel estimation signal to the user receiver; and S5, after receiving, by the user receiver, the channel estimation signal, evaluating whether the channel meets a broadband communication requirement, in response to the channel meeting the broadband communication requirement, starting broadband data transmission; in response to the channel not meeting the broadband communication requirement, performing a recheck.

In an embodiment, in step S3, the visible light locator first obtaining the 3D location coordinate of all available automatic tracking optical communication devices, and then selecting the automatic tracking optical communication device closest to the user location coordinate; after establishing a communication link, analyzing whether the communication link overlaps with other working communication links, in response to the being overlapped, selecting the nearby automatic tracking optical communication device to re-establish a communication link with the user receiver until the re-established communication link not overlapping with other working communication links; in response to no suitable communication link being found in the available automatic tracking optical communication device, the working communication link can be migrated to available automatic tracking optical communication devices that do not cause the beam overlap, leaving space communication links for new access users to ensure that communication links do not overlap.

In an embodiment, an inertial sensor is installed in the user receiver, in response to the user receiver shakes significantly and a shake value exceeds a set threshold, then the user receiver will re-estimate the user location coordinate and upload the new user location coordinate to the visible light locator, the visible light locator then transmits the new user location coordinate to the automatic tracking optical communication device, and the automatic tracking optical communication device will correct the horizontal direction and the pitch angle of the beam projector in real time, and the beam projector's projection direction is always aligned with the user's receiver.

In an embodiment, obtaining the user location coordinate, the following parameters should first be defined.

Since the positions of the N+1 LEDs with different orientations are several millimeters apart and close, it is approximately assumed that the location coordinate of the N+1 LEDs are the same. The 3D coordinate vectors of the LEDs on the integrated lamp are uniformly defined as:

$$S = [x_L, y_L, z_L]^T;$$

the 3D unit normal vector of the i-th LED's orientation is defined as:

$$n_i = [n_i^x, n_i^y, n_i^z];$$

the 3D coordinate vector of the photo detector (PD) on the receiver user equipment (UE) is defined as:

$$U = [x_U, y_U, z_U]^T;$$

the 3D unit normal vector of the PD's orientation is defined as: $n_U$;

the 3D direction vector from the integrated lamp location to the UE location is:

$$d = U - S = [x_U - x_L, y_U - y_L, z_U - z_L]^T;$$

the distance between the integrated lamp and UE is: $d = \|d\|_2$, where $\|\cdot\|$ represents the second order norm.

The radiation angle of the i-th LED relative to the UE is defined as $\phi_i$, then:

$$\cos\phi_i = \frac{n_i \cdot d}{d};$$

the incident angle of UE relative to the i-th LED is defined as $\varphi_i$, then:

$$\cos\varphi_i = -\frac{n_U \cdot d}{d};$$

the light intensity of i-th LED wick reaching the UE through line-of-sight propagation can be expressed as:

$$I_i = \beta_U P_L \frac{n+1}{2\pi} \cos^n\phi_i \cos^m\varphi_i \frac{A_U}{d^2} \tag{1}$$

$$F_i = \left(-\frac{n+1}{2\pi}\beta_U P_L A_U F_i\right) \cdot \frac{(n_i \cdot d)^n \cdot (n_U \cdot d)^m}{d^{(n+m+2)}}$$

$\beta_U$ is the response coefficient of the PD, $P_L$ is the radiated optical power of the LED, n is the Lambertian radiation lobe modulus (representing the directionality of the light source), m is the order of the PD, $A_U$ is the receiving area of the PD, $F_i$ is the indicator function, when the function is valued as 1 when in $\varphi \leq \varphi_{FOV}$, and is valued as 0 in other cases. $\varphi_{FOV}$ represents the field of view angle of the PD.

Let $$C = -\frac{n+1}{2\pi}\beta_U P_L A_U F_i,$$

then:

$$I_i = C \cdot \frac{(n_i \cdot d)^n \cdot (n_U \cdot d)^m}{d^{(n+m+2)}} \tag{2}$$

By dividing the corresponding received light intensities from any two different LEDs, the received intensity ratio $\alpha_{i,j}$ corresponding to the i-th LED and the j-th LED can be obtained, which can be written according to equation (2) as:

$$\alpha_{i,j} = \frac{I_i}{I_j} \approx \left(\frac{n_i \cdot d}{n_j \cdot d}\right)^n = \left(\frac{n_i \cdot [x_L - x_U, y_L - y_U, z_L - z_U]^T}{n_j \cdot [x_L - x_U, y_L - y_U, z_L - z_U]^T}\right)^n. \tag{3}$$

Further, let $x_D = x_L - x_U$, $y_D = y_L - y_U$, $z_D = z_L - z_U$, $U_D = [x_D, y_D, z_D]$ be regarded as the relative 3D coordinates of the UE relative to the visible light locator, then equation (3) can be written as:

$$\left(\alpha_{i,j}^{1/n} \cdot n_j^K - n_i^K\right)x_D + \left(\alpha_{i,j}^{1/n} \cdot n_j^y - n_i^y\right)y_D + \left(\alpha_{i,j}^{1/n} \cdot n_j^z - n_i^z\right)z_D = 0 \tag{4}$$

Equation (4) can further be written in the form of a homogeneous linear equation system AX=0, where $$A = \begin{bmatrix} \alpha_{0,1}^{1/n} n_1^x - n_0^x & \alpha_{0,1}^{1/n} n_1^y - n_0^y & \alpha_{0,1}^{1/n} n_1^z - n_0^z \\ \alpha_{0,2}^{1/n} n_2^x - n_0^x & \alpha_{0,2}^{1/n} n_2^y - n_0^y & \alpha_{0,2}^{1/n} n_2^z - n_0^z \\ \vdots & \vdots & \vdots \\ \alpha_{0,N}^{1/n} n_N^x - n_0^x & \alpha_{0,N}^{1/n} n_N^y - n_0^y & \alpha_{0,N}^{1/n} n_4^z - n_0^z \\ \alpha_{1,2}^{1/n} n_2^x - n_1^x & \alpha_{1,2}^{1/n} n_2^y - n_1^y & \alpha_{1,2}^{1/n} n_2^z - n_1^z \\ \vdots & \vdots & \vdots \\ \alpha_{1,N}^{1/n} n_N^x - n_1^x & \alpha_{1,N}^{1/n} n_N^y - n_1^y & \alpha_{1,N}^{1/n} n_N^z - n_1^z \\ \vdots & \vdots & \vdots \\ \vdots & \vdots & \vdots \\ \alpha_{N-1,N}^{1/n} n_N^x - n_{N-1}^x & \alpha_{N-1,N}^{1/n} n_N^y - n_{N-1}^y & \alpha_{N-1,N}^{1/n} n_N^z - n_{N-1}^z \end{bmatrix} \tag{5}$$

$$X = \begin{bmatrix} x_D \\ y_D \\ z_D \end{bmatrix} \tag{6}$$

Based on the above definition, the present application provides a method for quickly estimating a 3D location coordinate of a user receiver. The steps are as follows:

first step, calculating eigenvalues and eigenvectors of an orthogonal matrix $B = A^T A$, the orthogonal matrix B is a 3×3 matrix;

second step, sorting the eigenvalues from small to large to obtain the eigenvector corresponding to a minimum eigenvalue, the eigenvector represents an optimal solution of 3D normalized relative coordinates from the visible light locator to the user receiver, and is expressed as $\overline{U}_D = [\overline{x}_D, \overline{y}_D, \overline{z}_D]$;

third step, using, by the user receiver, the range measurement probe and inertial sensor to obtain a distance to a ceiling or a floor, and further obtain a vertical distance from the user receiver to the visible light locator $h_D$;

fourth step, estimating the 3D coordinate U of the UE through the formula $$U = [x_U, y_U, z_U] = \left[ x_L - \frac{h_D \bar{x}_D}{\bar{z}_D}, y_L - \frac{h_D \bar{y}_D}{\bar{z}_D}, z_L - h_D \right],$$

where $[x_L, y_L, z_L]$ is a 3D coordinate of the visible light locator.

Note that the 3D normalized relative coordinate can be obtained according to the singular value decomposition (SVD) algorithm provided by the above first step and second step, and the orientation angle between the visible light locator and UE can be obtained according to the 3D normalized relative coordinates.

Compared with the existing technology, the beneficial effects of the present application are as follows.

Firstly, the present application connects a visible light locator with a plurality of automatic tracking optical communication devices through a serial bus, and matches the most appropriate automatic tracking optical communication device for the user according to the user location coordinate, which can effectively solve the bottleneck problems of poor radiation communication quality in point-to-surface or 3D space and high bit error rate in the optical communication.

Secondly, each automatic tracking optical communication device of the present application still adopts point-to-point communication, which greatly saves the power consumption of the transmitting device.

Lastly, the present application adopts spatial beam isolation between each communication link, and the information transmission interference between different users is small, thereby further improving the communication quality.

BRIEF DESCRIPTION OF THE DRAWINGS

FIG. 7 is a schematic flowchart of a VLP-assisted multi-user optical communication method according to an embodiment of the present application.

DETAILED DESCRIPTION OF THE EMBODIMENTS

The technical solutions in the embodiments of the present application will be clearly and completely described below with reference to the drawings in the embodiment of the present application. Obviously, the described embodiments are only a part of the embodiments of the present application, not all of the embodiments. Based on the embodiments in the present application, all other embodiments perceived by those ordinary skills in the art without creative effort should be fallen within the protection scope of the present application.

Figure 1:
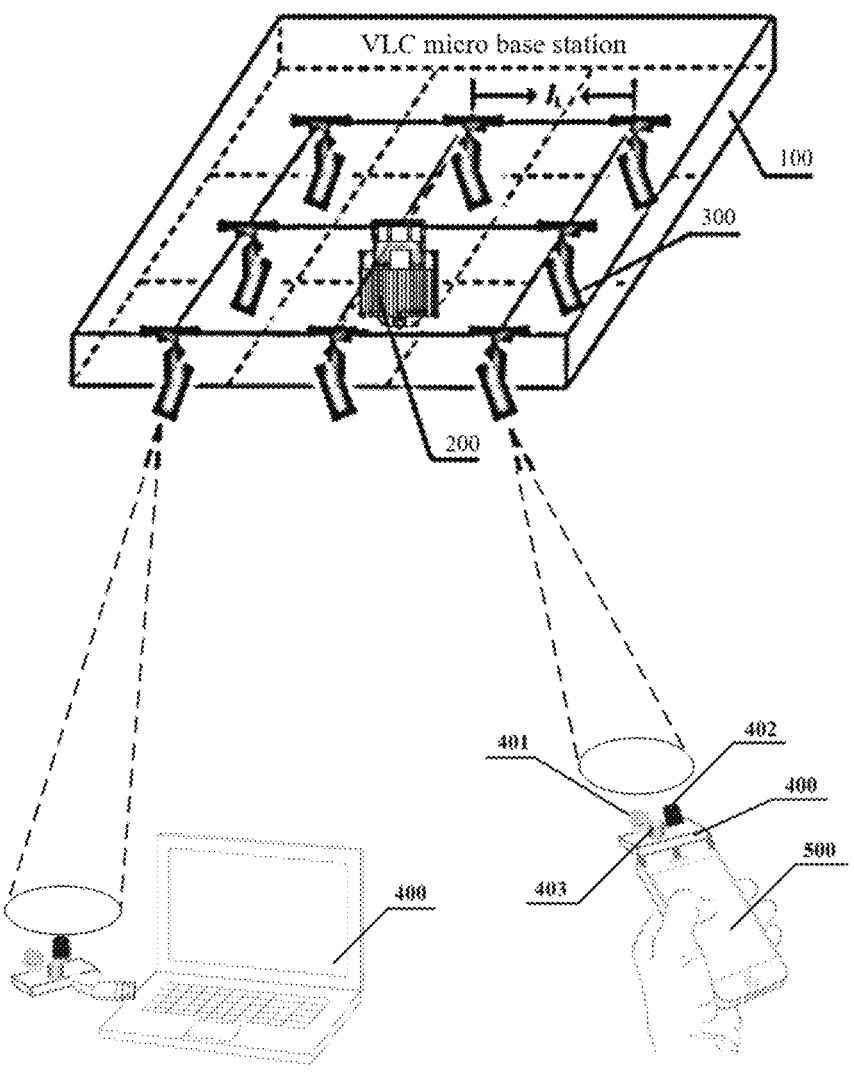
FIG. 1 is a schematic structural diagram of a visible light positioning (VLP)-assisted multi-user optical communication system according to an embodiment of the present application.

As shown in FIG. 1, the embodiment provides a visible light positioning (VLP)-assisted multi-user optical communication system, including a VLC micro base station and a user receiver 400; the VLC micro base station includes a mounting plate 100, and a visible light locator 200 is provided at a middle of a bottom surface of the mounting plate 100, the bottom surface of the mounting plate 100 is provided with eight automatic tracking optical communication devices 300 surrounding around the visible light locator 200 at equal intervals; the visible light locator 200 is connected to the eight automatic tracking optical communication devices through a serial bus, thereby achieving two-way communication between master and slave devices, in which the visible light locator 200 is the master device and the automatic tracking optical communication device 300 is the slave device. A micro base station ID and a current working status data of the automatic tracking optical communication devices 300 are cyclically broadcast to a coverage area through the visible light locator 200. User location coordinate and user identification are sent to the visible light locator 200 by the user receiver 400. An available automatic tracking optical communication device 300 closest to the user is designated to establish a communication link with the user receiver 400 according to the user location coordinate and the user identification.

Figure 2:
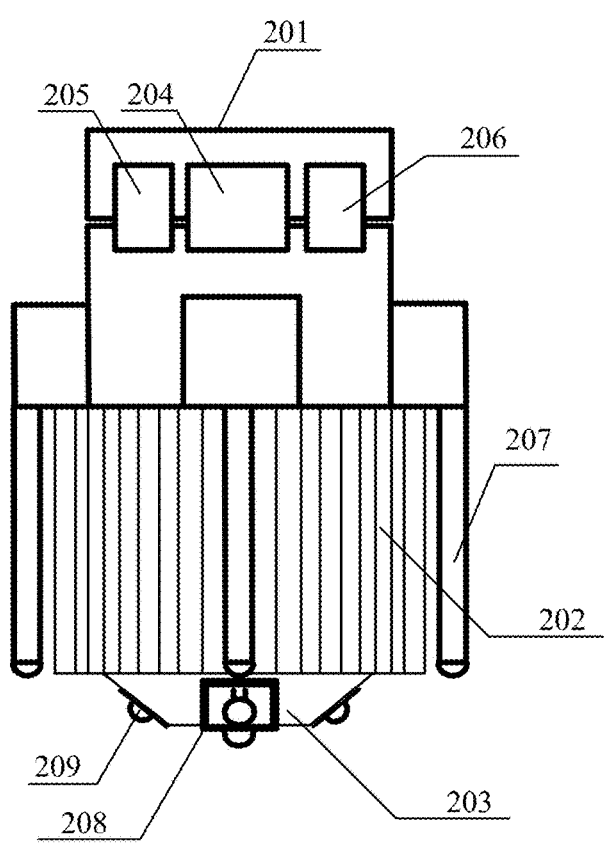
FIG. 2 is an inverted front view of a visible light locator according to an embodiment of the present application.
Figure 3:
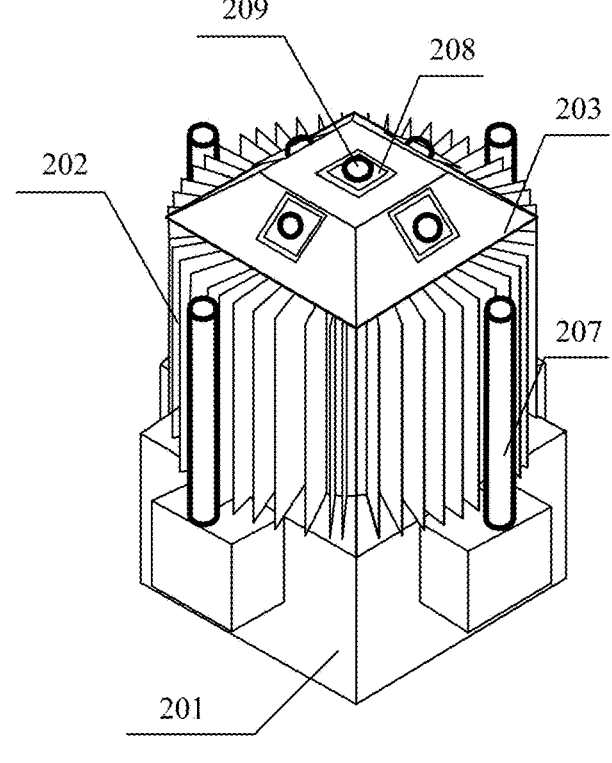
FIG. 3 is a side view of the visible light locator according to an embodiment of the present application.

In an embodiment, as shown in FIGS. 2 and 3, the visible light locator 200 includes a mounting base 201, a radiator 202 and a regular square frustum 203 metal block. The regular square frustum 203 is installed on the mounting base 201 through the radiator 202. The mounting base 201 is installed at a middle of the bottom surface of the mounting plate 100; the mounting base 201 is provided with a control module 204, an LED driving modulation module 205 and an infrared receiving module 206. The LED drive modulation module 205 and the infrared receiving module 206 are respectively connected to the control module 204. Four first infrared receiving tubes 207 are provided around the radiator 202, and the first infrared receiving tubes 207 are connected to the infrared receiving module 206. Five surfaces of the regular square frustum 203 are provided with circuit substrates 208 (aluminum or copper). Each circuit substrate 208 is provided with a standard Lambertian radiation LED 209, and the five LEDs 209 are respectively welded to the five circuit substrates 208. The LED 209 is connected to the LED drive modulation module 205 through the circuit substrate 208. The height of the first infrared receiving tube 207 is slightly higher than the LED 209 to prevent the signal emitted by the LED 209 from affecting the infrared signal received by the first infrared receiving tube 207. The first infrared receiving tube 207 is configured to receive the user location coordinate information sent by the user; the LED drive modulation module 205 is configured to drive the LEDs 209 in different directions to emit FSOOK signals with different frequencies. The control module 204 is configured to process the received infrared signals, generate LED driving signals, and perform master-slave device serial bus communication.

Figure 4:
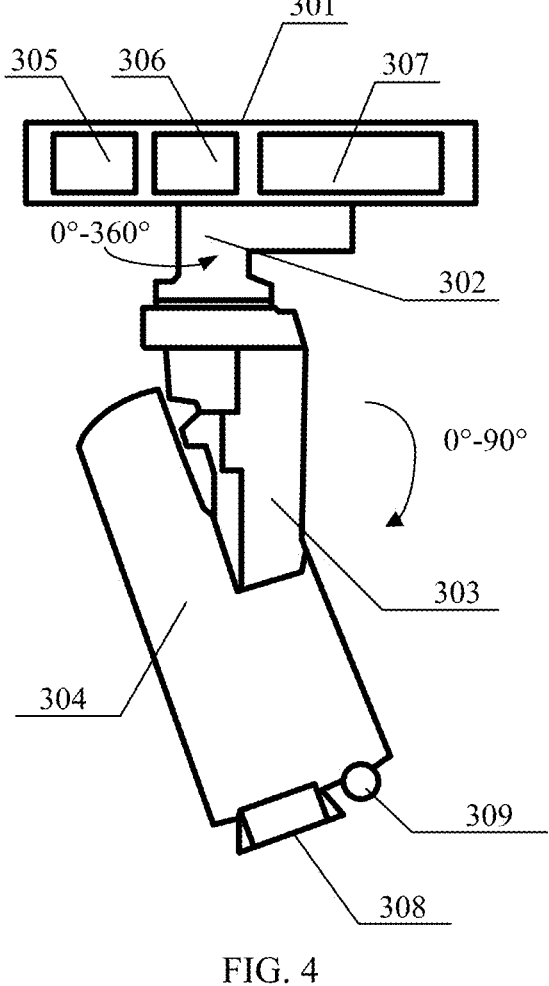
FIG. 4 is a schematic structural diagram of an automatic tracking optical communication device according to an embodiment of the present application.

In an embodiment, as shown in FIG. 4, the automatic tracking optical communication device 300 includes a base 301, and a horizontal rotation servo mechanism 302, a pitch rotation servo mechanism 303 and a beam projector 304 connected in sequence are installed on the base. The base

301 is provided with a data processing unit 305, a driving unit 306 and a communication signal processing unit 307. The driving unit 306 and the communication signal processing unit 307 are respectively connected to the data processing unit 305. The communication signal processing unit 307 leads to an Ethernet port and optical fiber port; the output end of the beam projector 304 is provided with a light emitting device 308 (narrow beam LED device is used in the embodiment) and a second infrared receiving tube 309 (a broadband infrared receiving tube is used in the embodiment). The light emitting device 308 and the second infrared receiving tube 309 are respectively connected to the data processing unit 305. The light emitting device 308 is configured to send downlink broadband data, and the second infrared receiving tube 309 is configured to receive an uplink broadband data. The driving unit 306 is configured to drive the horizontal rotation servo mechanism 302 and the pitch rotation servo mechanism 303 to perform 0-360° horizontal rotation and 0-90° vertical rotation respectively to adjust the horizontal direction and the pitch angle of the beam projector 304, so that the beam of the narrow beam LED device can always be aimed at the user receiver 400. The data processing unit 305 is configured to process the data sent by the visible light locator 200 and generate a target tracking signal to the driving unit 306.

In an embodiment, the beam projector 304 may also use a micro-mirror technology based on micro electro mechanical system (MEMS) or lidar's optical phased array (OPA) technology to adjust the beam angle, thereby realizing the real-time alignment function of communication links.

In an embodiment, the user receiver 400 includes a signal processing module, a photodiode 401 connected to the signal processing module (a high-speed photodiode is used in the embodiment), an infrared light emitting diode 402 and a range measurement probe 403. The photodiode 401 is configured to receive the optical signal emitted by the visible light locator 200 and the automatic tracking optical communication device 300. The infrared light emitting diode 402 is configured to send infrared signals to the visible light locator 200 and the automatic tracking optical communication device 300. The range measurement probe 403 is configured to measure the vertical distance between the user terminal and the ceiling or the ground, if the user terminal 500 is tilted, the tilt angle can be measured through the inertial sensor in the user terminal 500, and then correct the vertical distance; the signal processing module is configured to process and receive signals, and generate modulated signals.

As shown in FIG. 7, the embodiment of the present application further provides a VLP-assisted multi-user optical communication method, which includes the following steps:

S1, cyclically broadcasting, by a visible light locator 200, the VLC micro base station ID and the current working status identification data of the automatic tracking optical communication device 300 to a coverage area of the visible light locator 200. The current working status identification data of the automatic tracking optical communication device 300 is represented by bit data with several bytes. In an embodiment, one byte of 8 bits "10010110" is configured to represent the current working status of the eight automatic tracking optical communication devices 300, and the first bit "0" represents the No. 1 automatic tracking optical communication device 300 is currently in the available state. The second bit "1" indicates that the second automatic tracking optical communication device 300 is currently in the occupied state, that is, it indicates the frequency resource occupation identifier between the automatic tracking optical communication device 300 and the UE;

S2, after receiving the VLC micro base station ID and the current working status identification data of the automatic tracking optical communication device 300, selecting, by the user receiver 400, an unoccupied frequency resource as a carrier according to the current working status identification data, and uploading the user location coordinate and identification to the visible light locator 200;

S3, after receiving, by the visible light locator 200, the user location coordinate and user identification, designating the available automatic tracking optical communication device 300 closest to the user to establish a communication link with the user receiver 400, and transmit the user location coordinate and the user identification to the corresponding automatic tracking optical communication device 300 through the serial bus;

S4, after receiving, by the automatic tracking optical communication device 300, the user location coordinate, converting the user location coordinate into the pitch angle and the rotation angle through analysis and calculation, and then sending to the corresponding automatic tracking optical communication device 300, controlling the horizontal rotation servo mechanism 302 and the pitch rotation servo mechanism 303 to adjust the horizontal direction and the pitch angle of the beam projector 304 so that the beam projector 304 is aligned with the user receiver 400, and sending a channel estimation signal to the user receiver 400;

S5, after receiving, by the user receiver 400, the channel estimation signal, evaluating whether the channel meets the broadband communication requirements, in response to the channel meeting the broadband communication requirement, starting broadband data transmission; in response to the channel not meeting the broadband communication requirement, performing a recheck.

In an embodiment, in step S3, the visible light locator 200 first obtains the 3D location coordinate of all available automatic tracking optical communication devices 300, and then selects the automatic tracking optical communication device 300 closest to the user location coordinate; after establishing a communication link, analyze whether the communication link overlaps with other working communication links. In response to that the communication link overlaps with other working communication links, selecting the adjacent automatic tracking optical communication device 300 and the user receiver 400 to re-establish the communication link until the re-established communication link is not overlapped with other working communication links.

In an embodiment, the user receiver 400 is equipped with an inertial sensor. If the user receiver 400 shakes significantly and the shake value exceeds a set threshold, the user receiver 400 will re-estimate its own user location coordinate and upload the new user location coordinate to the visible light locator (Integrated lamp) 200. The visible light locator 200 then transmits the new user location coordinate to the automatic tracking optical communication device 300. The automatic tracking optical communication device 300 corrects the beam projector 304 in real time according to the new user location coordinate. The horizontal direction and the pitch angle ensure that the projected direction of the beam projector 304 is always aligned with the user receiver 400.

Figure 5:
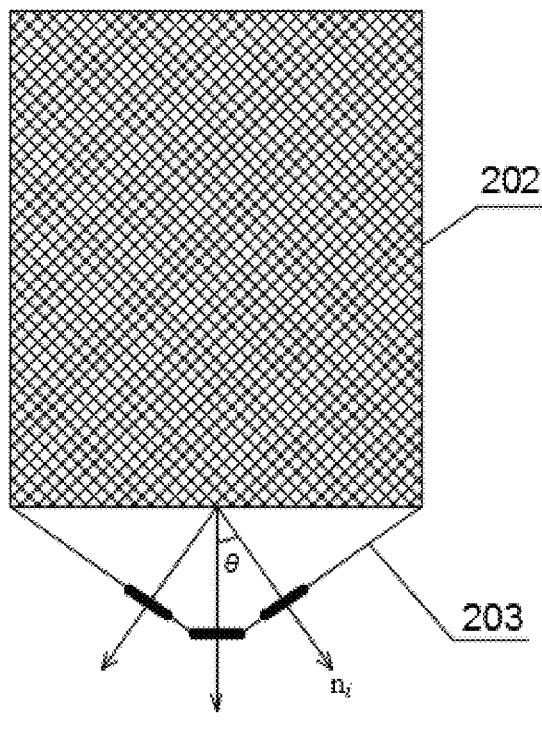
FIG. 5 is a simplified plan view of the visible light locator according to an embodiment of the present application.

In an embodiment, as shown in FIG. 5, in order to obtain the user location coordinate, the following parameters must first be defined.

Since the positions of the five LEDs with different orientations are several millimeters apart and close, it is approximately assumed that the 3D coordinate positions of the five LEDs are the same. The 3D coordinate vectors of the LEDs on the integrated lamp are uniformly defined as:

$$S=[x_L,y_L,z_L]^T;$$

the 3D unit normal vector of the i-th LED's orientation is defined as:

$$n_i = [n_i^x, n_i^y, n_i^z];$$

the 3D coordinate vector of the photo detector (PD) on the receiver user equipment (UE) is defined as:

$$U=[x_U,y_U,z_U]^T;$$

the 3D unit normal vector of the PD's orientation is defined as: $n_U$;

the 3D direction vector from the integrated lamp location to the UE location is:

$$d=U-S=[x_U-x_L,y_U-y_L,z_U-z_L]^T;$$

the distance between the integrated lamp and UE is: $d=\|a\|_2$, the radiation angle of the i-th LED relative to the UE is defined as $\phi_i$, then:

$$\cos\phi_i = \frac{n_i \cdot d}{d};$$

the incident angle of UE relative to the i-th LED is defined as $\varphi_i$, then:

$$\cos\varphi_j = -\frac{n_U \cdot d}{d};$$

the light intensity of i-th LED wick reaching the UE through line-of-sight propagation can be expressed as:

$$I_i = \beta_U P_L \frac{n+1}{2\pi}\cos^n\phi_i\cos^m\varphi_i\frac{A_U}{d^2}F_i = \qquad (1)$$

$$\left(-\frac{n+1}{2\pi}\beta_U P_L A_U F_i\right)\cdot\frac{(n_i \cdot d)^n \cdot (n_U \cdot d)^m}{d^{(n+m+2)}}$$

$\beta_U$ is the response coefficient of the PD, $P_L$ is the radiated optical power of the LED, n is the Lambertian radiation lobe modulus (representing the directionality of the light source), m is the order of the PD, $A_U$ is the receiving area of the PD, $F_i$ is the indicator function, when the function is valued as 1 when in $\varphi \leq \varphi_{FOV}$, and is valued as 0 in other cases. $\varphi_{FOV}$ represents the field of view angle of the PD.

Let $$C = -\frac{n+1}{2\pi}\beta_U P_L A_U F_i,$$

then:

$$I_j = C\cdot\frac{(n_i \cdot d)^n \cdot (n_U \cdot d)^m}{d^{(n+m+2)}} \qquad (2)$$

By dividing the corresponding received light intensities from any two different LEDs, the received intensity ratio $\alpha_{i,j}$ corresponding to the i-th LED and the j-th LED can be obtained, which can be written according to equation (2) as:

$$\alpha_{i,j} = \frac{I_i}{I_j} \approx \left(\frac{n_i \cdot d}{n_j \cdot d}\right)^n = \left(\frac{n_i \cdot [x_L - x_U, y_L - y_U, z_L - z_U]^T}{n_j \cdot [x_L - x_U, y_L - y_U, z_L - z_U]^T}\right)^n \qquad (3)$$

Further, let $x_D = x_L - x_U$, $y_D = y_L - y_U$, $z_D = z_L - z_U$, $U_D = [x_D, y_D, z_D]$ be regarded as the relative 3D coordinates of the UE relative to the visible light locator, then equation (3) can be written as:

$$\left(\alpha_{i,j}^{1/n}\cdot n_j^K - n_i^K\right)x_D + \left(\alpha_{i,j}^{1/n}\cdot n_j^y - n_i^y\right)y_D + \left(\alpha_{i,j}^{1/n}\cdot n_j^z - n_i^z\right)z_D = 0 \qquad (4)$$

Equation (4) can further be written in the form of a homogeneous linear equation system AX=0, $$A = \begin{bmatrix} \alpha_{0,1}^{1/n}n_1^x - n_0^x & \alpha_{0,1}^{1/n}n_1^y - n_0^y & \alpha_{0,1}^{1/n}n_1^z - n_0^z \\ \alpha_{0,2}^{1/n}n_2^x - n_0^x & \alpha_{0,2}^{1/n}n_2^y - n_0^y & \alpha_{0,2}^{1/n}n_2^z - n_0^z \\ \vdots & \vdots & \vdots \\ \alpha_{0,N}^{1/n}n_N^x - n_0^x & \alpha_{0,N}^{1/n}n_N^y - n_0^y & \alpha_{0,N}^{1/n}n_4^z - n_0^z \\ \alpha_{1,2}^{1/n}n_2^x - n_1^x & \alpha_{1,2}^{1/n}n_2^y - n_1^y & \alpha_{1,2}^{1/n}n_2^z - n_1^z \\ \vdots & \vdots & \vdots \\ \alpha_{1,N}^{1/n}n_N^x - n_1^x & \alpha_{1,N}^{1/n}n_N^y - n_1^y & \alpha_{1,N}^{1/n}n_N^z - n_1^z \\ \vdots & \vdots & \vdots \\ \alpha_{N-1,N}^{1/n}n_N^x - n_{N-1}^x & \alpha_{N-1,N}^{1/n}n_N^y - n_{N-1}^y & \alpha_{N-1,N}^{1/n}n_N^z - n_{N-1}^z \end{bmatrix} \qquad (5)$$

$$X = \begin{bmatrix} x_D \\ y_D \\ z_D \end{bmatrix} \qquad (6)$$

Based on the above definition, the present application provides a method for quickly estimating a 3D location coordinate of a user receiver. The steps are as follows:

first step, calculating eigenvalues and eigenvectors of an orthogonal matrix B=A$^T$A, the orthogonal matrix B is a 3×3 matrix;

second step, sorting the eigenvalues from small to large to obtain the eigenvector corresponding to a minimum eigenvalue, the eigenvector represents an optimal solution of 3D normalized relative coordinates from the visible light locator to the user receiver, and is expressed as $\overline{U}_D = [\overline{x}_D, \overline{y}_D, \overline{z}_D]$;

third step, using, by the user receiver, the range measurement probe and inertial sensor to obtain a distance to a ceiling or a floor, and further obtain a vertical distance from the user receiver to the visible light locator $h_D$;

fourth step, estimating the 3D coordinate U of the UE through the formula $$U = [x_U, y_U, z_U] = \left[ x_L - \frac{h_D \bar{x}_D}{\bar{z}_D}, y_L - \frac{h_D \bar{y}_D}{\bar{z}_D}, z_L - h_D \right], [x_L, y_L, z_L]$$

is a 3D coordinate of the visible light locator.

Note that the 3D normalized relative coordinate can be obtained according to the singular value decomposition (SVD) algorithm provided by the above first step and second step, and the orientation angle between the visible light locator and UE can be obtained according to the 3D normalized relative coordinates.

In the embodiment, the parameter setting in Table 1 below is taken as an example to analyze and simulate the location coordinate method based on the visible light locator of a regular square frustum provided in the embodiment. It should be pointed out that the method for quickly estimating three-dimensional coordinates provided by the present application is also applicable to visible light locators based on other regular N frustums or pyramids.

TABLE 1

| parameters for simulation | |
| --- | --- |
| Parameter | Value |
| Room size (length*width*height) $[l_R, w_R, h_R]$ | 10 m × 10 m × 5 m |
| Number of visible light locator wicks, N | 5 |
| LED optical power, $P_L$ | 3 W |
| LED half power angle, $\theta_{1/2}$ | 60 degrees |
| LED Lambertian radiation lobe modulus, n | 1 |
| PD receiving area, $A_U$ | 1 cm$^2$ |
| PD photoelectric conversion efficiency, $\beta_U$ | 0.4 A/W |
| LED orientation angle, $\theta$ | 20 degrees |
| Visible light locator coordinates, $[x_L, y_L, z_L]$ | [0, 0, 4] |
| UE user receiver noise power, $\sigma^2$ | 10$^{-15}$ A$^2$ |
| A/D sampling frequency, $f_s$ | 96 kHz |
| window points, L | 9600 |
| UE height from the ground, $h_U$ | 1.2 m |

The five LEDs of the visible light locator 200 emit FSOOK signals of different frequencies through a triode or field effect tube switch control circuit. The frequency configuration of the five LEDs is as shown in Table 2 below.

TABLE 2

| LED frequency configuration | |
| --- | --- |
| LED serial number | Frequency (Hz) |
| LED 0 | 1600 |
| LED 1 | 1800 |
| LED 2 | 2000 |
| LED 3 | 2200 |
| LED 4 | 2400 |

Figure 6:
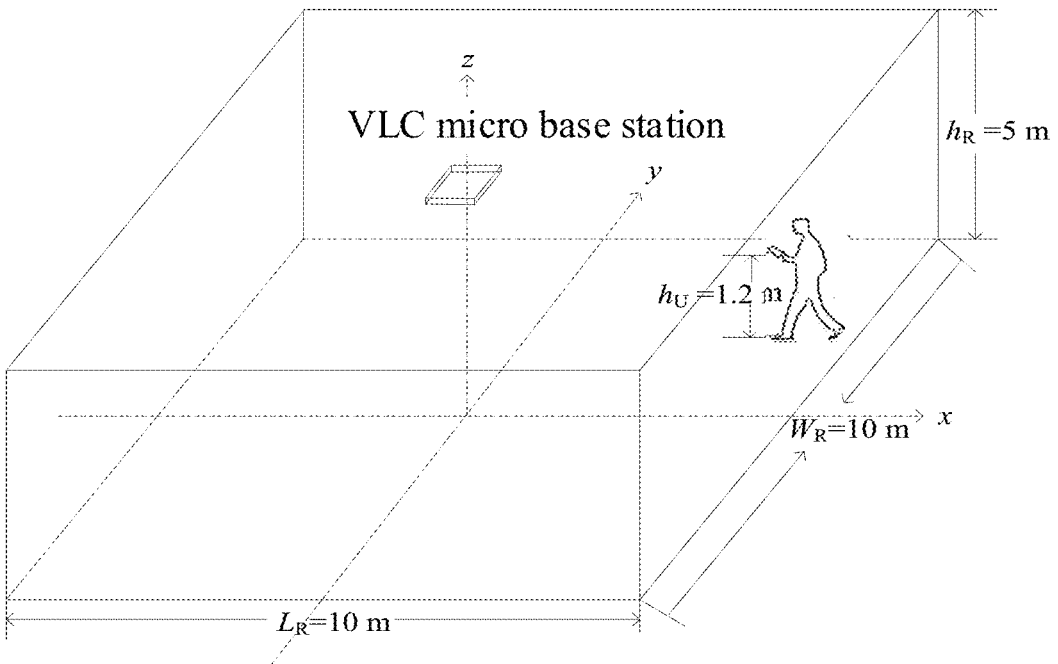
FIG. 6 is an application scenario configuration diagram of an optical communication system according to an embodiment of the present application.

The A/D sampling frequency of the user receiver is set to 96 kHz, and the number of sampling window points is set to 9600. The user receiver uses the Goertzel algorithm to extract the light intensity spectrum amplitude emitted by the five LEDs. In the embodiment, the direction normal vectors of the five LEDs are: $n_0=[0,0,-1]$, $n_1=[\sin \theta, 0, -\cos \theta]$, $n_2=[0, \sin \theta, -\cos \theta]$, $n_3=[-\sin \theta, 0, -\cos \theta]$ and $n_4=[0, -\sin \theta, -\cos \theta]$. The VLC micro base station is installed on the middle ceiling of a room with a length, width and height of 10 m×10 m×5 m. As shown in FIG. 6, the height of the user holding the UE from the floor is set to 1.2 m, and the height can be obtained through the distance detector in the UE.

TABLE 3

| three-dimensional distribution data of location error (LE) performance simulation | | | | |
| --- | --- | --- | --- | --- |
| Case | Angle α | Angle β | Average LE (cm) | Maximum LE (cm) |
| a | 0° | 0° | 3.63 | 12.7 |
| b | 0° | +170° | 3.66 | 12.1 |
| c | +20° | +20° | 3.71 | 15.2 |
| d | +20° | +140° | 3.75 | 16.6 |
| e | +40° | +50° | 8.26 | 3534 |
| f | +40° | −130° | 7.91 | 1966 |
| g | −30° | +70° | 3.87 | 31.43 |
| h | −30° | −120° | 3.94 | 50.6 |

Assuming the vertical distance from the user receiver to the visible light locator $h_D$ has been obtained by the range measurement probe and inertial sensor, i. e., $h_D$ is known.

As shown in case (a) and case (b) of table 3, it can be observed that when the PD of the UE terminal is placed flat, that is, a α=0°, no matter how the UE azimuth angle β changes, the average LE of the positioning algorithm in this embodiment is about 3.66 cm, and the maximum LE is about 12.7 cm. It can be observed from case (c) and case (d) of table 3 that when the PD of the UE terminal is tilted upward by 20 degrees, that is a α=20°, no matter how the UE azimuth angle β changes, the average LE of the positioning algorithm provided by the system is about 3.75 cm, and the maximum LE is about 16.6 cm. Compared with the PD horizontal placement, the positioning performance at a tilt of 20 degree is slightly reduced, and the change is not significant. It can be observed from case (e) and case (f) of table 3 that when the PD tilts upward 40 degrees, that is, α=40°, the LE of the UE in most areas is within 5 cm, while in some edge areas, LE deteriorates rapidly and the LE is extremely large. The reason for this phenomenon is that when the tilt angle of the UE is too large, the optical signal emitted by one or two LEDs cannot be received at certain azimuth angles and positions, resulting in the inability to extract the spectrum amplitude normally, and the spectral amplitude distortion is large or extremely weak, eventually leading to a maximum LE. To solve this phenomenon, we can further consider eliminating these abnormal spectral amplitudes so that they do not participate in the positioning algorithm processing. Furthermore, it can be observed from case (g) and case (h) of table 3 that when the PD is tilted downward by 30 degrees, the average LE obtained is about 3.94 cm, and in some edge areas, the LE is larger, but not exceeding 60 cm.

The simulation result of table 3 shows that the provided VLP structure and algorithm can support the small-angle tilt and random adjustment of the azimuth angle of the UE terminal. When the tilt angle case (polarization angle) β∈[−20°, 20°], the average LE is about 4 cm, which can effectively meet all requirements for the system provided by the present application. When the tilt angle of the UE is too large, there is still a large part of the area that can meet the functional requirements, and in some locations, the rapid deterioration of LE can be alleviated through further optimization.

Those skilled in the art should understand that embodiments of the present application may be provided as methods, systems or computer program products. Accordingly, the present application may take the form of an entire hardware embodiment, an entire software embodiment, or an embodiment combining software and hardware aspects. Furthermore, the present application may take the form of a computer program product embodied on one or more computer-usable storage media (including, but not limited to, disk storage, CD-ROM, optical storage, etc.) having computer-usable program code embodied therein.

The present application is described with reference to flowchart illustrations and/or block diagrams of methods, apparatus (systems), and computer program products according to embodiments of the application. It will be understood that each process and/or block in the flowchart illustrations and/or block diagrams, and combinations of processes and/or blocks in the flowchart illustrations and/or block diagrams, can be implemented by computer program instructions. These computer program instructions may be provided to a processor of a general purpose computer, special purpose computer, embedded processor, or other programmable data processing device to produce a machine, such that the instructions executable on the computer or other programmable device can generate apparatus for realizing the functions specified in a process or processes of a flowchart diagram and/or a block or blocks of a block diagram.

These computer program instructions may also be stored in a computer-readable memory that causes a computer or other programmable data processing device to operate in a particular manner, such that the instructions stored in the computer-readable memory produce an article of manufacture including the instruction apparatus, the instructions apparatus implements the functions specified in a process or processes of the flowchart and/or a block or blocks of the block diagram.

These computer program instructions may also be loaded onto a computer or other programmable data processing device, causing a series of operating steps to be performed on the computer or other programmable device to produce computer-implemented processing, thereby the instructions executable on the computer or other programmable device providing steps for implementing the functions specified in a process or processes of a flowchart diagram and/or a block or blocks of a block diagram.

Although embodiments of the present application have been shown and described, for those skilled in the art, it should be understood that various changes, modifications, and substitutions can be made to these embodiments without departing from the principles and spirit of the application, and, the scope of the application is defined by the appended claims and the equivalents thereof.

What is claimed is:

1. A visible light positioning (VLP)-assisted multi-user optical communication system, comprising:
a micro base station; and
a user receiver, wherein:
the micro base station comprises a mounting plate, a visible light locator is provided at a middle of a bottom surface of the mounting plate, the bottom surface of the mounting plate is provided with a plurality of automatic tracking optical communication devices surrounding around the visible light locator;
the visible light locator is connected to the plurality of automatic tracking optical communication devices through a serial bus;
a micro base station ID and a current working status data of the automatic tracking optical communication devices are cyclically broadcast to a coverage area through the visible light locator;
the user receiver is configured to send a user location coordinate and a user identification to the visible light locator; and
the visible light locator is configured to designate an available automatic tracking optical communication device closest to the user to establish a communication link with the user receiver according to the user location coordinate and the user identification.

2. The VLP-assisted multi-user optical communication system according to claim 1, wherein:
the visible light locator comprises a mounting base, a radiator and a regular N frustum, $N \geq 3$, and $N \in Z^+$;
the regular N frustum is installed on the mounting base through the radiator, and the mounting base is installed at a middle of the bottom surface of the mounting plate;
the mounting base is provided with a control module, an LED drive modulation module and an infrared receiving module, and the LED drive modulation module and infrared receiving module are respectively connected to the control module;
a plurality of first infrared receiving tubes are provided around the radiator, and the first infrared receiving tubes are connected to the infrared receiving module;
N+1 surfaces of the regular N frustum are provided with circuit substrates, each circuit substrate is provided with an LED, and the LED is connected to the LED drive modulation module through the circuit substrate;
the first infrared receiving tube is configured to receive the user location coordinate information sent by the user;
the LED drive modulation module is configured to drive the LED to emit frequency shift key (FSK) signals with different frequencies; and
the control module is configured to process the received infrared signal and generate the LED drive signal.

3. The VLP-assisted multi-user optical communication system according to claim 1, wherein:
the automatic tracking optical communication device comprises a base, and a horizontal rotation servo mechanism, a pitch rotation servo mechanism and a beam projector connected in sequence are installed on the base;
the base is provided with a data processing unit, a driving unit and a communication signal processing unit, and the driving unit and the communication signal processing unit are respectively connected to the data processing unit;
the output end of the beam projector is provided with a light emitting device and a second infrared receiving tube, the light emitting device and the second infrared receiving tube are respectively connected to the data processing unit;
the light emitting device is configured to send downlink broadband data, and the second infrared receiving tube is configured to receive uplink broadband data;
the driving unit is configured to drive the horizontal rotation servo mechanism and the pitch rotation servo mechanism to adjust a horizontal direction and a pitch angle of the beam projector; and
the data processing unit is configured to process data sent by the visible light locator, and generate a target tracking signal to the driving unit.

4. The VLP-assisted multi-user optical communication system according to claim 1, wherein:

the user receiver comprises a signal processing module, a photodiode connected to the signal processing module, an infrared light emitting diode and a range measurement probe;

the photodiode is configured to receive an optical signal emitted by the visible light locator and the automatic tracking optical communication device;

the infrared light emitting diode is configured to send infrared signals to the visible light locator and the automatic tracking optical communication device; and the range measurement probe is configured to measure height data; the signal processing module is configured to process and receive signals, and generate modulated signals.

5. A method for quickly estimating a 3D location coordinate of a user receiver, based on the visible light positioning (VLP)-assisted multi-user optical communication system according to claim 1, comprising:

calculating an orthogonal matrix $B=A^TA$; wherein:

$$A = \begin{bmatrix} \alpha_{0,1}^{1/n}n_1^x - n_0^x & \alpha_{0,1}^{1/n}n_1^y - n_0^y & \alpha_{0,1}^{1/n}n_1^z - n_0^z \\ \alpha_{0,2}^{1/n}n_2^x - n_0^x & \alpha_{0,2}^{1/n}n_2^y - n_0^y & \alpha_{0,2}^{1/n}n_2^z - n_0^z \\ \vdots & \vdots & \vdots \\ \alpha_{0,N}^{1/n}n_N^x - n_0^x & \alpha_{0,N}^{1/n}n_N^y - n_0^y & \alpha_{0,N}^{1/n}n_4^z - n_0^z \\ \alpha_{1,2}^{1/n}n_2^x - n_1^x & \alpha_{1,2}^{1/n}n_2^y - n_1^y & \alpha_{1,2}^{1/n}n_2^z - n_1^z \\ \vdots & \vdots & \vdots \\ \alpha_{1,N}^{1/n}n_N^x - n_1^x & \alpha_{1,N}^{1/n}n_N^y - n_1^y & \alpha_{1,N}^{1/n}n_N^z - n_1^z \\ \vdots & \vdots & \vdots \\ \vdots & \vdots & \vdots \\ \alpha_{N-1,N}^{1/n}n_N^x - n_{N-1}^x & \alpha_{N-1,N}^{1/n}n_N^y - n_{N-1}^y & \alpha_{N-1,N}^{1/n}n_N^z - n_{N-1}^z \end{bmatrix}$$

$\alpha_{i,j}$ represents a light intensity ratio value from an i-th LED and a j-th LED, $$\alpha_{i,j} = \frac{I_i}{I_j},$$

wherein $I_i$ and $I_j$ represent a light intensity of the i-th LED and the j-th LED;

$$n_i^x, n_i^y$$

and $$n_i^z$$

respectively represent a unit normal vector of the i-th LED along an x-axis, a y-axis and a z-axis, n represents the Lambertian radiation lobe modulus of the LED; the orthogonal matrix B is a 3×3 matrix;

calculating eigenvalues and eigenvectors of the orthogonal matrix B;

sorting the eigenvalues from small to large to obtain the eigenvector corresponding to a minimum eigenvalue, the eigenvector represents an optimal solution of 3D normalized relative coordinates from the visible light locator to the user receiver, and is expressed as $\overline{U}_D=[\overline{x}_D, \overline{y}_D, \overline{z}_D]$;

using, by the user receiver, the range measurement probe and inertial sensor to obtain a distance to a ceiling or a floor, and further obtain a vertical distance from the user receiver to the visible light locator $h_D$; and estimating the three-dimensional coordinate U of the user receiver through the formula $$U = [x_U, y_U, z_U] = \left[x_L - \frac{h_D\overline{x}_D}{\overline{z}_D}, y_L - \frac{h_D\overline{y}_D}{\overline{z}_D}, z_L - h_D\right],$$

wherein $[x_L, y_L, z_L]$ is a 3D coordinate of the visible light locator.

6. A visible light positioning (VLP)-assisted multi-user optical communication method, based on the VLP-assisted multi-user optical communication system according to claim 1, comprising:

cyclically broadcasting, by a visible light locator, a micro base station ID and a current working status identification data of an automatic tracking optical communication device to a coverage area of the visible light locator;

after receiving the micro base station ID and the current working status identification data of the automatic tracking optical communication device, selecting, by the user receiver, an unoccupied frequency resource as a carrier according to the current working status identification data, and uploading a user location coordinate and a user identification to the visible light locator;

after receiving, by the visible light locator, the user location coordinate and the user identification, designating an available automatic tracking optical communication device closest to the user to establish a communication link with the user receiver, and transmit the user location coordinate and the user identification to a corresponding automatic tracking optical communication device through a serial bus;

adjusting, by the automatic tracking optical communication device, the horizontal direction and the pitch angle of beam projector according to the user location coordinate, aligning the beam projector with the user receiver, and sending a channel estimation signal to the user receiver; and after receiving, by the user receiver, the channel estimation signal, evaluating whether the channel meets a broadband communication requirement, in response to the channel meeting the broadband communication requirement, starting broadband data transmission; in response to the channel not meeting the broadband communication requirement, performing a recheck.

7. The VLP-assisted multi-user optical communication method according to claim 6, wherein, in the after receiving, by the visible light locator, the user location coordinate and the user identification, designating the available automatic tracking optical communication device closest to the user to establish the communication link with the user receiver, and transmit the user location coordinate and the user identification to the corresponding automatic tracking optical communication device through the serial bus, the visible light locator first obtaining the user location coordinate of all available automatic tracking optical communication devices, and then selecting the automatic tracking optical communication device closest to the user location coordinate; after establishing a communication link, analyzing whether the communication link overlaps with other working communication links, in response to the being overlapped, selecting the nearby automatic tracking optical communication device to re-establish a communication link with the user receiver until the re-established communication link not overlapping with other working communication links; in response to no suitable communication link being found in the available automatic tracking optical communication device, the working communication link is capable of being migrated to available automatic tracking optical communication devices that do not cause the beam overlap, leaving space communication links for new access users to ensure that communication links do not overlap.

8. The VLP-assisted multi-user optical communication method according to claim 6, wherein an inertial sensor is installed in the user receiver, in response to the user receiver shakes significantly and a shake value exceeds a set threshold, then the user receiver will re-estimate the user location coordinate and upload a new user location coordinate to the visible light locator, the visible light locator then transmits the new user location coordinate to the automatic tracking optical communication device, and the automatic tracking optical communication device will correct the horizontal direction and the pitch angle of the beam projector in real time, and a beam projector's projection direction is always aligned with the user's receiver.

* * * * *